United States Patent [19]

Huang et al.

[11] Patent Number: 5,491,325
[45] Date of Patent: Feb. 13, 1996

[54] METHOD AND SYSTEM FOR PAYMENT AND PAYMENT VERIFICATION

[76] Inventors: Dorge O. Huang, 3540 S. Parnell, 1st Flr., Chicago, Ill. 60609-1727; Robert B. Peterson, 603 S. Wesley, Oak Park, Ill. 60304

[21] Appl. No.: 339,917

[22] Filed: Nov. 15, 1994

Related U.S. Application Data

[63] Continuation of Ser. No. 935,021, Aug. 25, 1992, abandoned.

[51] Int. Cl.$^6$ .................................................. G06F 17/60
[52] U.S. Cl. ...................... 235/379; 340/825.34; 364/408
[58] Field of Search .................................. 235/379, 380; 340/825.34; 364/408

[56] References Cited

U.S. PATENT DOCUMENTS

| | | | |
|---|---|---|---|
| 3,890,599 | 6/1975 | Simjian | 340/825.34 |
| 3,985,998 | 10/1976 | Crafton | 235/380 |
| 3,990,558 | 11/1976 | Ehrat | 340/825.34 |
| 4,630,201 | 12/1986 | White | 235/379 |
| 4,774,513 | 9/1988 | Bonnaval-Lamothe et al. | 340/825.34 |
| 4,974,878 | 12/1990 | Josephson | 283/70 |
| 5,044,668 | 9/1991 | Wright | 283/58 |
| 5,367,148 | 11/1994 | Storah et al. | 340/825.34 |

Primary Examiner—F. L. Evans
Attorney, Agent, or Firm—Welsh & Katz, Ltd.

[57] ABSTRACT

A payment verification method and system includes the imprinting of code indicia, such as a bar code, on the face of a payment document, such as a stock certificate, check, or note. The bar code and a corresponding data file, is generated by an automated computerized process. The code indicia serves as an index to a corresponding data file in a database which can be communicated to a drawee banking institution serving as broker for the funds as identified in the check so that the institution has prior knowledge of information relating to the check. Such knowledge is used to verify the authenticity of the check and amount of funds committed. After the check has been honored by the brokering institution and returned to the issuer or drawer, a computerized system scans the bar code and records the receipt of the authorized instrument by updating the corresponding data file.

10 Claims, 5 Drawing Sheets

METHOD AND SYSTEM FOR PAYMENT AND PAYMENT VERIFICATION

This is a continuation of application Ser. No. 07/935,021, filed on Aug. 25, 1992, now abandoned.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyrights whatsoever.

FIELD OF INVENTION

The present invention relates generally to document authentication and account maintenance systems and more particularly to computerized payment and payment verification systems for generating payment documents, authenticating payment documents and properly maintaining payment accounts.

BACKGROUND OF THE INVENTION

Payment documents such as a negotiable instruments or other redeemable securities such as stock certificates are typically exchanged in place of hard currency to facilitate payment for the receipt of goods, services or other considerations. The use of drafts, such as checks, has served to reduce theft by facilitating a confirmation of receipt of payment through the process of endorsement and deposit, thereby verifying the transaction. In normal business activities there are a variety of events that lead to the issuance of a check or other draft creating a traceable transaction trail.

Typically, the use of payment documents such as a check requires the establishment of a relationship or account between the issuer of payment document and a brokering institution or final authenticator that serves as a broker and clearing house to receive and transfer funds. In the specific case of checks, the issuer may be considered the drawer and the brokering institution or final authenticator may be considered the bank or drawee with which the drawer has an account. Such institutions are generally part of a network of similar institutions so that a payee may present the check to any of the institutions in the network and receive payment.

Checks are normally pre-printed by commercial establishments specializing in such forms and are purchased in quantities by businesses and individuals. These checks are produced on "safety" paper having a printed pattern that is designed to physically and visually indicate whether original information is altered. Such checks are printed with a basic format that includes spaces for date, name of payee, the amount to be paid and an authorizing signature or imprint, all to be filled in by the drawer. In addition to the foregoing format, there is typically encoded a routing number that identifies the broker institution thus allowing the check to be "deposited" at any networked institution. The checks are returned to the brokering institution, with which the drawer has an account, by the network of receiving institutions.

Additionally, for the brokering institution's internal accounting purposes, the account number of the drawer and the check number may also be printed on the face of the draft or check. This printing is done at the time the check is commercially printed. This information is printed within a specific location and requires the use of special printed characters (font) using ink having magnetic properties. A drawee bank typically serves as a final authenticator of a check before releasing funds from a drawers account.

When a drawee bank receives the check, an operator must typically insert the checks into a magnetic ink reader to verify the drawee number on the check and the drawer's account number. An account maintenance process usually requires the operator to type in the amount of the check to be debited from the drawer's account and verifies the authenticity of the signature of the drawer. The manual handling of the check by the operator and the manual entry of the check amount typically becomes the bottleneck in the account maintenance process. Improperly entered check amounts and slow entry rates can drastically reduce check processing throughput.

A problem arises with such traditional payment and payment verification systems where a proper signature is present but the amount of the check has been modified and/or where a blank pre-printed check has been stolen and the drawer's signature has been accurately forged so that quick visual inspection by an operator does not identify the signature as a forgery. Furthermore, the drawee or final authenticator does not have any knowledge as to which payment documents have been properly authorized by the drawer. Also, access to the pre-printed checks requires physical transport of the checks to the proper location within an office before the pre-printed checks may be filled out by a computer or by manual operation. Yet a further problem exists because a pre-printed number sequence must be maintained manually by the drawer and may be interrupted by selecting the wrong sequence of forms. Also pre-printed forms must typically be discarded when a typographical error or other mistake has been entered on the face of the form.

SUMMARY OF THE INVENTION

An object of the invention is to provide a method and system of payment and payment verification which overcomes the above problems by providing payment data to the final authenticator or drawee institution for an identifiable and specified instrument prior to the payment verification and account maintenance process.

Another object of the invention is to provide a method and system of payment and payment verification wherein an unique index code for each instrument can be read by a code reading device to identify and reveal a plurality of detailed information regarding the instrument bearing such unique code so that a plurality of information can be recalled through access to a computerized database, thereby creating efficiencies, reducing errors and increasing security.

It is another object of the invention to provide an interactive payment system for printing all of the necessary elements of a negotiable instrument entirely from computer prepared data and menu items selected from stored graphics which can only be activated through a series of predetermined conditions.

Yet a further object of the invention is to facilitate an improved account maintenance process for the drawer or issuer by providing a quick and automatic computerized process for maintaining an accurate account balance through the use of the index code imprinted on the face of the instrument and the corresponding data file cross referenced to the index code.

The method and system of payment verification includes determining an index code which uniquely identifies the payment document and serves as an index corresponding to an original data file; generating the original data file using at least payment information associated with the payment document; storing, in a memory device, the original data file; imprinting the index code on the payment document; communicating the original data file to a verification system, such as over a telephone link to a drawee bank's computer; storing the communicated original data file as a verification data file in a memory device of the verification system; reading the index code from the payment document using a code reading device which communicates with the verification memory device; and verifying the authenticity of the payment document by accessing the verification data file from the verification system and determining whether the read index code correctly identifies the payment document as an authorized payment document.

The method and system may further include automatically subtracting the payment amount from an account based upon the payment information when the index code correctly identifies the authorized payment document. The verification process continues by having the issuer reconcile the account by reading the index code from the authorized payment document once the authorized instrument is returned to the issuer. The issuer, using an index code reader, such as a bar code scanning device, scans the index code from the authorized payment document. The issuing computer updates the original data file to indicate receipt of the authorized payment document in response to the read index code.

A method for generating a payment document incorporating the index code is also disclosed which includes generating a print file containing format parameters for defining a predetermined format for the payment document; providing a database with a plurality of data such as, the index code, payee identification information and payment due information; generating the original data file which includes the payee identification information, the payment due information and the drawer identification information; and printing, onto blank paper stock, the index code, the payee identification information, the payment due information and the drawer identification information in conformance with the print file parameters.

DESCRIPTION OF THE PREFERRED EMBODIMENTS

Figure 1:
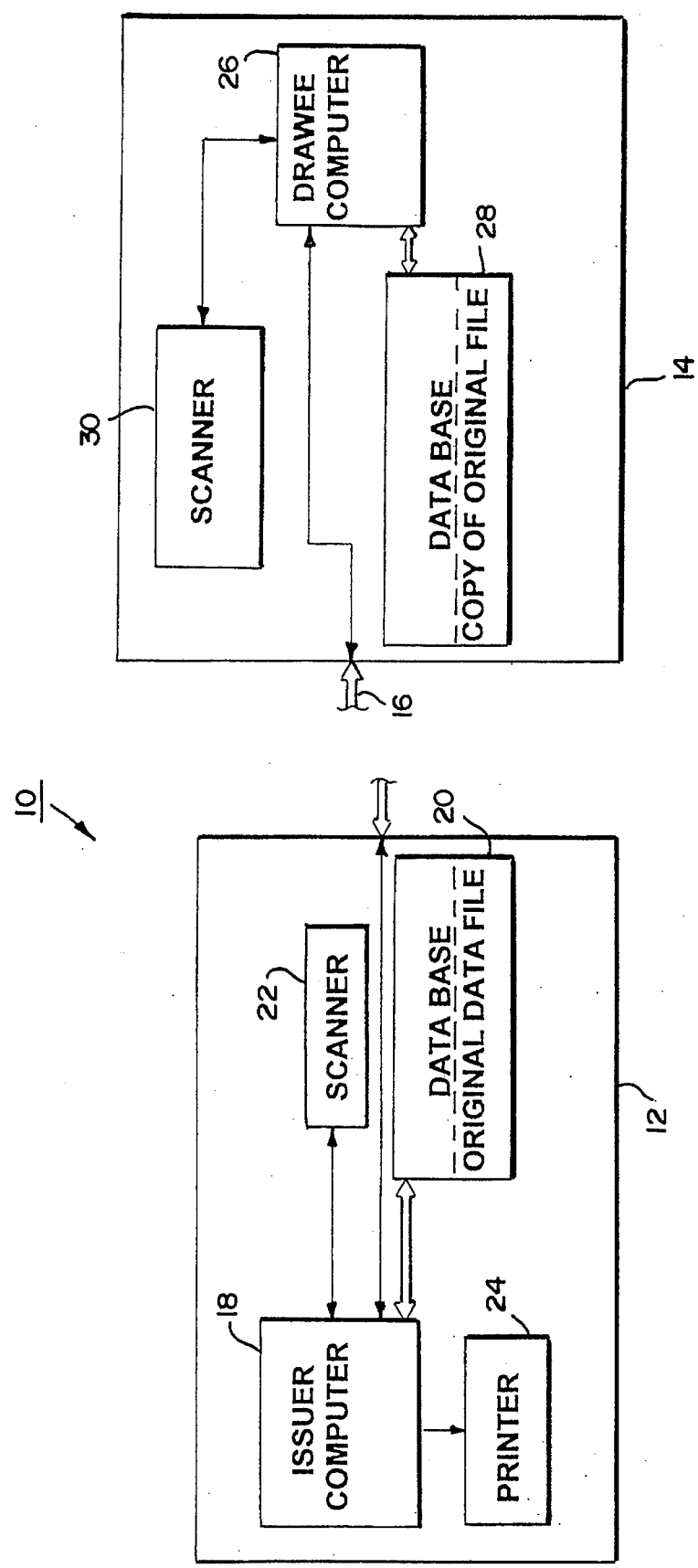
FIG. 1 is a block diagram generally depicting the system of payment and payment verification in accordance with the invention.

FIG. 1 generally illustrates a payment and payment verification system which includes an issuer payment and reconciliation computer system 12 and a corresponding verification computer system 14, such as a drawee bank's verification computer system which are in communication with each other through communication link 16 such as a telephone line, an optic link, a radio frequency link, or other suitable communication link. The issuer computer system 12 includes a computer 18 such as a Macintosh LC, manufactured by Apple Computer, or other suitable computing device, coupled to a memory device 20 such as a RAM or ROM for use as a database. The issuer computer system 12 also includes an issuer bar code scanner 22 coupled to the computer 18 and a printer 24 such as a 24 Pin Dot Matrix printer capable of using a magnetic ink ribbon, or a laser printer capable of using magnetic toner. The bar code reader 22 may be a wand scanner or bar code gun capable of reading Code 39 type bar code. The preferred software base for the computer 18 is a MacOS 7.01 operating system using 4th Dimension 2.23 (a Macintosh programming language) using a Macintosh Computer with system embedded MICR fonts, 18 point with graphic printing capability. However, any suitable computer system may also be used.

The verification computer system 14 includes a computer 26 similar in design to the issuer computer 18, coupled to a storage device 28 such as a RAM or ROM configured for use as a database similar to the issuer database 20. The verification computer system 14 also includes a bar code scanner 30 coupled to the computer 26 for reading the bar code as printed on the instrument by the issuer printer 24. The bar code reader 30 may be the same type of bar code reader as the issuer bar code reader 22.

Figure 2:
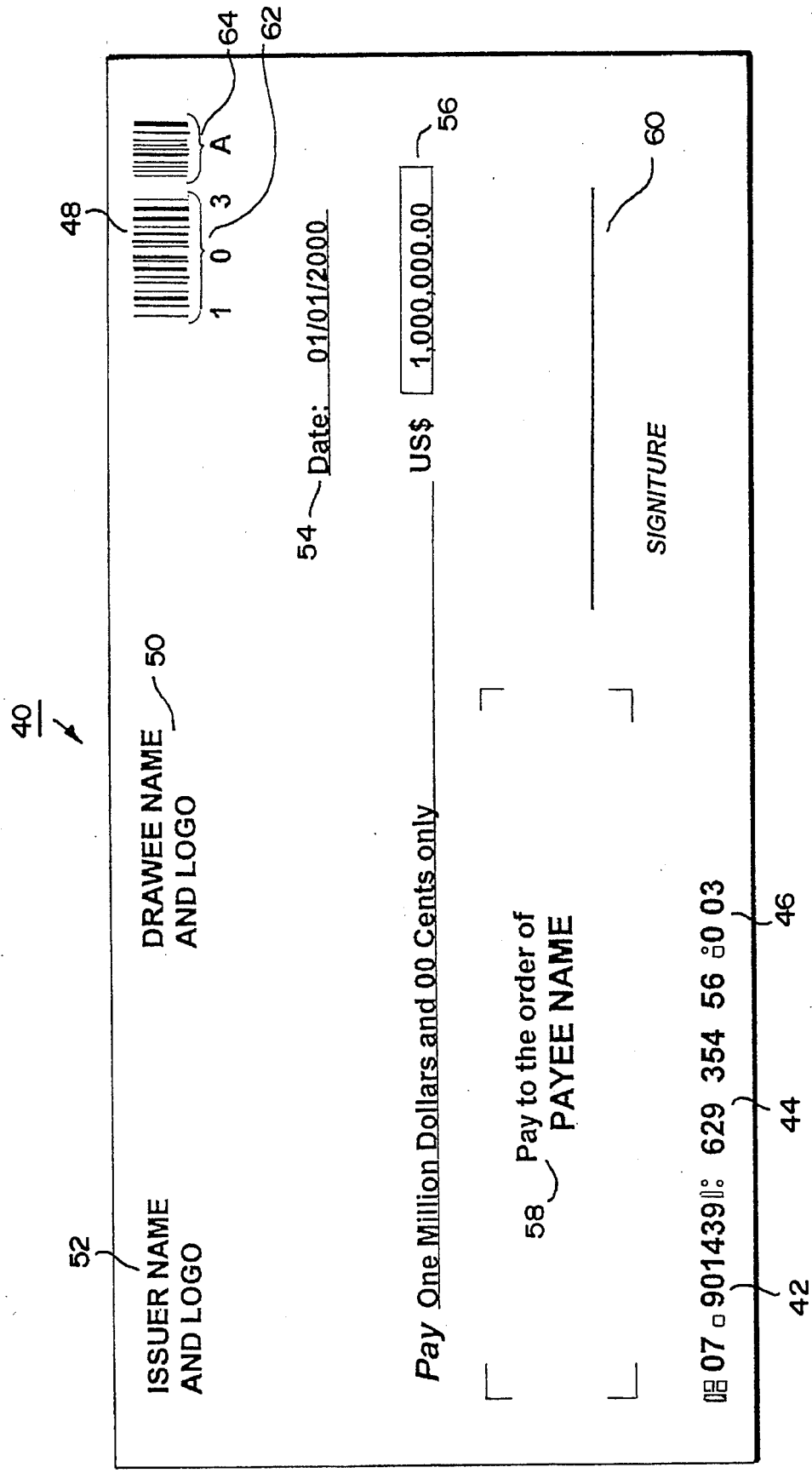
FIG. 2 generally illustrates a common format of a check in accordance with the present invention.

FIG. 2 generally depicts a payment document in the form of a negotiable instrument 40 such as a check as generated by the issuer computer system 12. The check 40 represents a common format of a check with routing number 42 and account number 44 and check number 46 all in special font as known in the art. The check 40 also includes an index code 48 shown in the form of a bar code. The check 40 may be formed from a blank paper stock that may be any size, weight, quality or other specification suitable for the purpose. Perforations may be added to separate the check 40 from a portion (not shown) serving as a record of other information pertaining to the check as known in the art. The check number 46, drawee logo 50 and identification of issuer 52 are optional elements. The date 54, amount to be paid 56 and identification of payee 58 are generated by the issuer computer 18 and printed by the printer 24 as will be described later. The authorizing signature line 60 or other computer generated graphics are discretionary. The specific layout, fonts, number of elements and use of magnetic ink, as shown, are preferable but not necessary in carrying out the invention.

The index code 48 uniquely identifies the payment document 40 and serves as an index corresponding to an original check data file. The index code 48 represents a combination of check number 62 and account number 64. The account number 64 can be a single character A, representing an internal company identification or can be a plurality of characters representing the full bank account number 44, depending on the intended use of the bar code. The specific bar code font used for the purpose of the preferred embodiment is type 39, but any suitable code indicia may be used.

Figure 3:
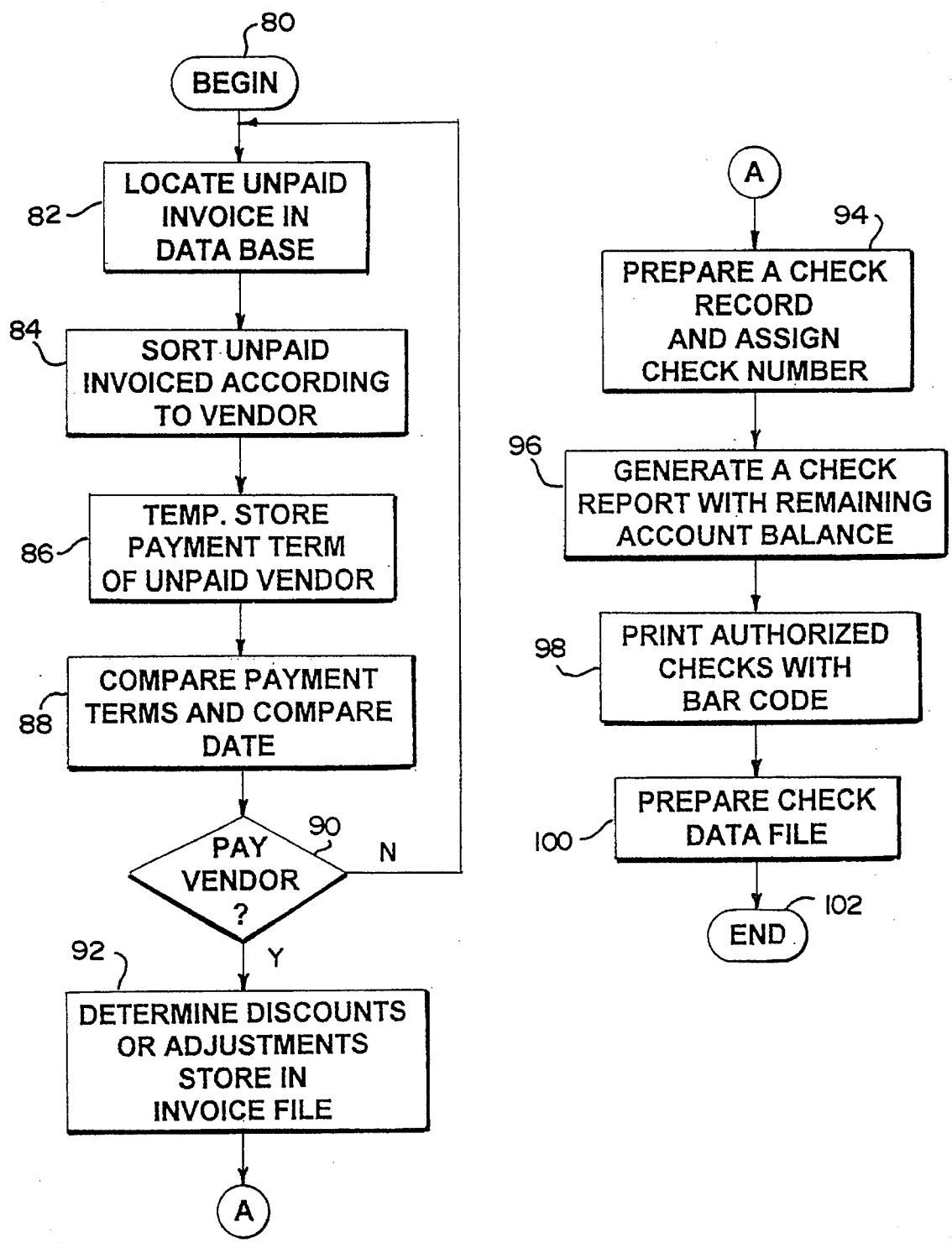
FIG. 3 is a flow diagram generally illustrating the payment process used by the issuer in accordance with the invention.

FIG. 3 generally illustrates the payment process carried out by the issuer computer system 12, under software control, which generally begins after the requisite material and/or services are received and verified by a receiving department in the issuer's company. The database 20 is structured to include a plurality of data files.

The process for payment and payment verification may be carried out by setting up a plurality of files into which specific data is stored. For example, a purchase order data file may be set up which includes the purchase order number, the name of the vendor, and the corresponding invoice number. A vendor data file may be set up which includes the name of the vendor, the terms agreed to by the vendor and the payee, the address of the vendor and the check number and account against which the check is to be written. A bank data file may be set up which indicates the names of the banks and corresponding account numbers for the plurality of banks used by the issuer. For example, if the issuer has checking accounts with a number of banks and each of the banks uses a number of accounts, each of the banks and corresponding accounts are stored in the bank data file. An invoice data file may be set up which includes the invoice numbers with corresponding vendors and corresponding purchase orders, the date of the invoice and the discount terms of the invoice.

A bank statement data file may be set up which indicates the date of the statement and the bank name from which the statement came. The check data file, or original data file, may be set up to include the check number, the date of the check, the vendor to which the check is addressed, the purchase order number for which the check is to satisfy payment, the bank name from which the check is to be drawn, the invoice number to which the check pertains and the statement number identifying the returned check.

The issuer payment process as carried out by the issuer computer 18 begins in block 80 after vital information, such as purchase order information and invoice information, has been input in the issuer computer 18 via a keyboard (not shown) or suitable input device. The computer 18 organizes the data in the database 20 as an invoice data file. The data files are located in the database 20 and are designed according to well known database design criteria. Data entry is restricted to certain users, such as purchasing agents, etc. In block 82, the computer locates or searches the invoice file for unpaid invoices as of the date of the search. After a search is completed and all unpaid invoices in the database are located, the computer sorts the unpaid invoices according to vendors or payees as shown in block 84.

In block 86, the sorted unpaid invoices are temporarily stored whereafter the payment terms are compared to terms currently agreed to by the parties as stored in an updated vendor file as indicated in block 88. The computer 18 determines whether or not payment is due based on the current date of the search as indicated in block 90. When payment is not due, the process begins over again on another payment date or on another invoice data file if several invoice data files are used. However, when payment is due to a vendor, the issuer computer system 12 determines the discounts or adjustments needed to accurately state the payment amount. Any interest payments are also added or deducted from each invoice amount as shown in Block 92. After the correct amount owed to a vendor has been calculated, the amount calculated is stored as part of an original check record data file.

In block 94, the computer 12 generates the original check record data file for the particular vendor and particular invoices and assigns a check number to a check to be generated which satisfies the amount owed as determined in block 92. The computer 12 generates a check report for all of the checks which are determined to be due during this payment period as indicated in block 96. The check report includes a list of all the checks with the total remaining account balance which may be reviewed on screen or in a printed format by authorized personnel. The authorized personnel may then verify the accuracy of the record before issuance of a check.

In block 98, the computer retrieves the information from the database 20 and prints an authorized check 40 using the printer 24. A check is printed by generating a print file containing format parameters for defining a predetermined format for the payment document. An operator or the computer 18 functioning as an index code generator determines the index code which uniquely identifies the payment document.

The computer generates the original data file which includes the payee identification information, the payment due information and the drawer identification information and stores the data file in memory. The computer 18 processes the print file and outputs print information to the printer 24. The printer prints the payment document onto blank paper stock by printing the index code, the payee identification information, the payment due information and the drawer identification information in conformance with the print file parameters. The check 40 includes a bar code which serves as the index code 48 and includes the check number and account against which the check is drawn.

Next, the original check data file is prepared as shown in block 100 which includes the check number, the date of issuance of the check, the vendor name, the purchase order number, the bank name under which the check is drawn and the invoices to which the check corresponds. A user may only print a check after a series of predetermined conditions have been met, e.g., after the proper entry of information. The payment process from the issuers computer system 12 is then completed for the given payment period as indicated in block 102.

Figure 4:
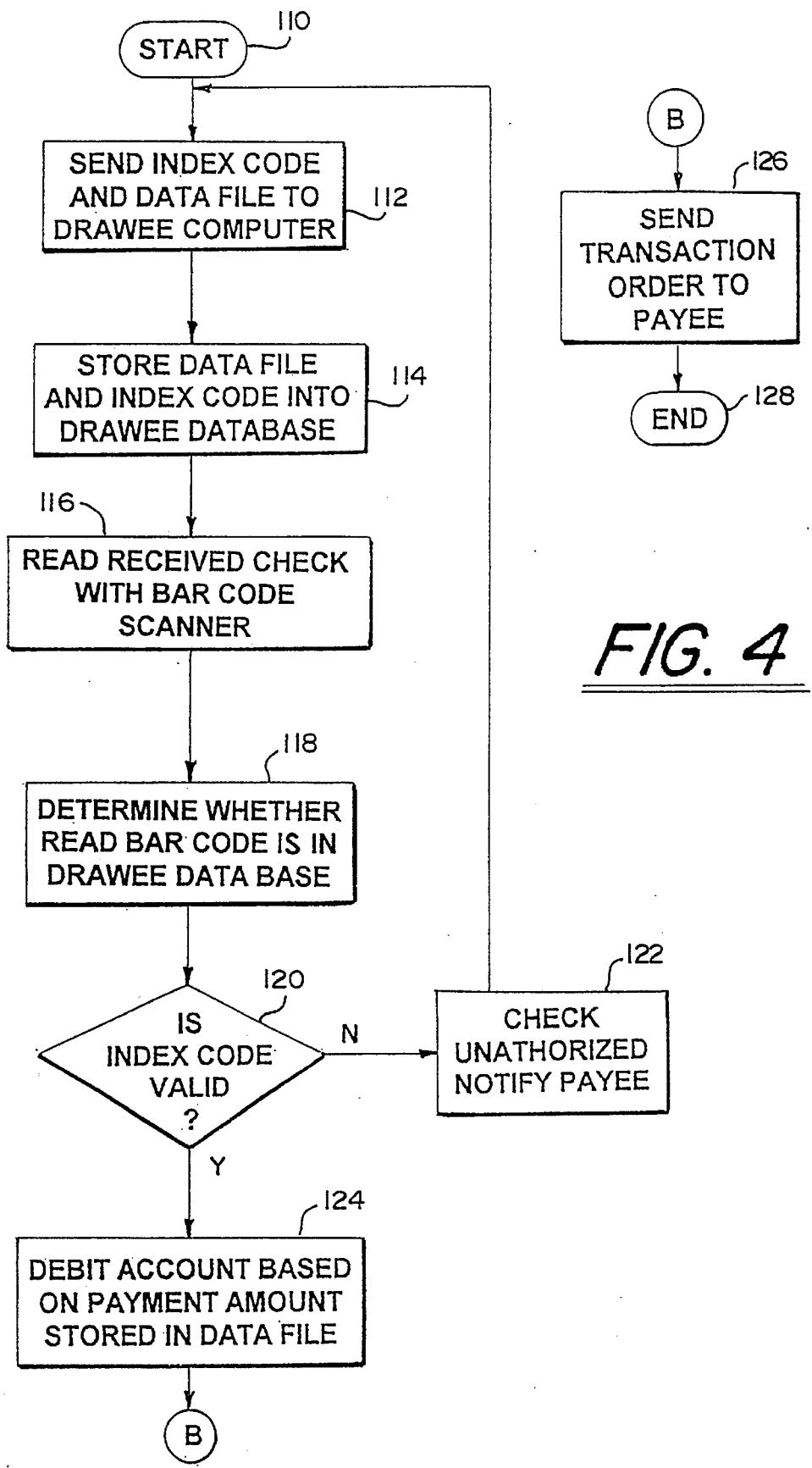
FIG. 4 is a flow diagram generally depicting the verification process used to authenticate a payment document in accordance with the invention.

FIG. 4 illustrates the drawee verification process. In block 110, after the holder of the check has presented the check to an institution, the receiving institution forwards the negotiable instrument to the drawee bank (payment agent of the payor). Prior to receiving the instrument, the issuer transfers the index code and data file to the drawee computer system 14 via the communication link 16 (e.g., a wireline and modem) as indicated in block 112. The drawee computer 26 then stores a copy of this original data file and corresponding index code in its database 28 as indicated in block 114. Once the check is received by the drawee institution, the check is automatically fed through a check processing device or stacker as known in the art, during which time the magnetic ink is read to identify the account and banking institution or drawee institution. In block 116, the index code is also read with the bar code scanner 30 to determine whether the instrument 40 is a valid instrument as generated by the issuer computer 12.

To determine whether the instrument 40 is a valid or authentic instrument, the drawee computer system 14 as shown in Block 118, compares the read index code to its stored index code as retrieved from its database 28. The drawee computer 26 determines whether the index code is valid as shown in block 120. If the drawee computer 26 is unable to locate the index code as read by its scanner 30, the drawee computer 26 determines that the check is unauthorized and notifies the issuer as indicated in block 122. When the drawee computer 26 is able to locate the read index code as compared with its stored index code in its database 28, the drawee computer 26 debits the issuers account based on the payment amount stored in the corresponding data file as indicated in block 124. In block 126, the drawee computer 26 sends a transaction record or bank statement to the issuer along with the scanned checks. The verification process for the drawee computer system 14 is then complete as indicated in block 128.

Figure 5:
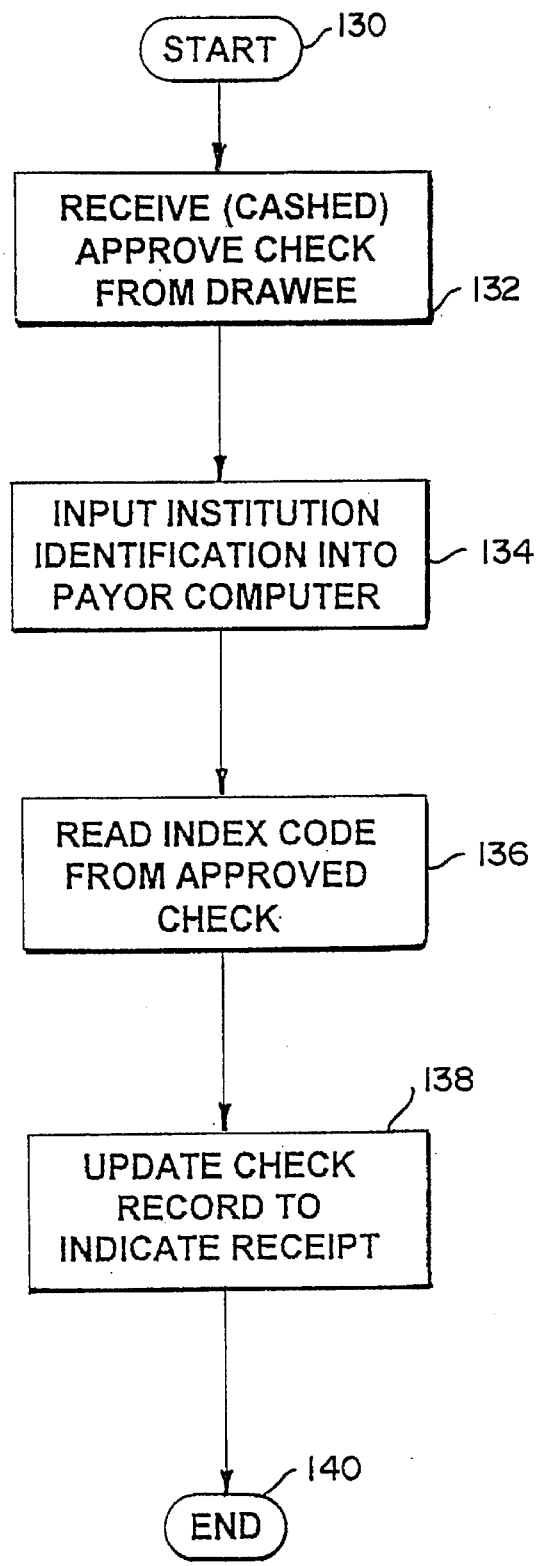
FIG. 5 is a flow diagram generally depicting the account reconciliation process used by the issuer in accordance with the invention.

FIG. 5 generally illustrates the issuer account reconciliation process which is initiated upon receipt of the bank statement from block 126 of FIG. 4. The received checks which were approved by the drawee bank are sent to the drawee as indicated in block 132. The issuer then inputs the proper institution identification into the computer 18 which then pulls up the check data files for the outstanding checks as indicated in block 134. The issuer computer system 12, in combination with an operator, scans the returned checks using code scanner 22 as indicated in block 136. Once the bar code is read, the issuer computer 12 locates the corresponding data file and updates the data file indicating that the check has been processed by the drawee bank. In block 138, the computer verifies the balance in his account and indicates a debit of the amount for which the instrument was written. The issuer account reconciliation process is then completed as indicated in Block 140.

Based on the foregoing, it can be seen that any check that is not included in the down loaded check data communicated to the drawee bank database 38 is an unauthorized check. This helps eliminated unauthorized checks since only authorized checks, numbers and information pertaining to the authorized checks are transmitted to the drawee institution via the communication link. The index code identifies a corresponding data file which contains unique information pertaining only to the check containing the index code. The check data file includes the payee name, the issue date, the amount of the check, and the code number and the index code number. Using the above system and process, the need for a check data clerk to slide each individual check into a magnetic code read and physically type in the check amount is no longer a necessity for the check clearing process or check verification process. The speed of the check clearing is only governed by the speed of the automatic code reader 30.

Preferably, all procedures and processes are generated from one and only one data input source. Therefore, all reports are generated from the same unique and accessible data source. Since other data is required to proceed, the possibility of human intervention or judgment error (intentionally or unintentionally) is not a factor of the system's efficiency. All data may be available to a hierarchy of users and therefore instantly accessible to all persons with pre-established access privileges. For example, numerous computer terminals may be networked to allow distributed access to the system so that the data may be entered and instruments may be generated from multiple locations. Typically, access to the system may be restricted to a particular location within a building and/or to a particular day of the week and time of day to reduce the possibility of tampering with the payment system. However, it will be recognized that certain users such as the chief financial officer or the owner of the company may be given unrestricted access to the system.

In another embodiment, the computer system may be networked with a central check processing center where all checks from a group of institutions are sent for processing. Therefore, the central check process center would include a central computer for storing check information similar to that discussed with respect to the drawee institution.

The Appendix is a code listing written in 4th Dimension 2.23 (a Macintosh programming language) using a Macintosh Computer with a MacOS 7.01 operating system and performs the payment process as generally indicated in FIG. 3. This program listing contains material which is subject to copyright protection.

Additional advantages and modifications will be apparent to those skilled in the art. The invention in its broader aspects is, therefore, not limited to the specific details, representative apparatus, and illustrative examples shown and described. Accordingly, departure may be made from such details without departing from the scope of the general inventive concept as defined by the appended claims and their equivalents.

What is claimed is:

1. A system of payment verification for a payment document from a payor to a payee comprising:

an index code generator, for determining an index code, which uniquely identifies the payment document and serves as an index corresponding to an original data file;

a computer of the payor, operatively coupled to said index code generator, for generating said original data file using at least a payment value associated with the payment document;

a first memory, operatively coupled to said index code generator and computer, for storing said original data file;

a printer, operatively coupled to said index code generator, for imprinting said index code on the payment document;

a modem, operatively coupled to said computer of the payor, for communicating said original data file to a verification means within a computer system of a payment agent of the payor;

a second memory, operatively coupled to said verification means, for storing said communicated original data file as a verification data file;

a character reader, of the payor's agent, operatively coupled to said verification means, for reading said index code from the payment document using a code reader which is operatively coupled to said second memory; and said verifying means adapted to verify the authenticity of the payment document by accessing said verification data file from said second memory and determining whether said read index code correctly identifies the payment document as an authorized payment document.

2. The system of claim 1 further comprising:

means, operatively coupled to said verification means, for subtracting a payment amount, based upon said payment information, from an account when said index code correctly identifies the payment document as an authorized payment document;

means, operatively coupled to said first memory means, for reading said index code from the payment document after the payment document has been verified by said verification means; and means, operatively coupled to said computer of the payor, for modifying said original data file to indicate receipt of said authorized payment document in response to said read index code.

3. The system of claim 1 wherein said printer further includes means for applying a bar code to a face of the payment document.

4. The system of claim 1 wherein said original data file further includes a name of a payee and an issuing date of the payment document.

5. The system of claim 3 wherein said character reader includes a bar code scanning device.

6. A method of payment verification for a payment document bearing indicia authorizing payment from a payor to a payee comprising the steps of:

generating and storing an original data file within a storage means of a computer of the payor using at least a payment value associated with the payment document;

establishing an index code by the payor which uniquely identifies the payment document and serves as an index corresponding to the original data file;

imprinting said index code on the payment document;

transferring said original data file from the computer of the payor to a computer of the payor's agent;

reading said index code from the payment document by the payor's agent using a code reading means operatively coupled to the computer of said payor's agent; and accessing said original data file by the payor's agent within the computer of the payor's agent via the index code to verify the authenticity of the payment document by verifying that information in the original data file is the same as corresponding information on the payment document.

7. The method of claim 6 further comprising the step of:

subtracting a payment amount, based upon said payment information in said verification data file, from an account when said index code correctly identifies the payment document as an authorized payment document.

8. The method as in claim 6 wherein imprinting said index code further comprises applying a bar code to a face of the payment document.

9. The method as in claim 6 wherein said information further comprises a name of a payee and an issuing date of the payment document.

10. The method as in claim 6 wherein said code reading means further comprises a bar code scanning device.

* * * * *